Dec. 22, 1942.  A. A. ANDERSON  2,305,592
APPARATUS FOR DISPENSING AND MEASURING ADHESIVE TAPE
Filed Aug. 3, 1940
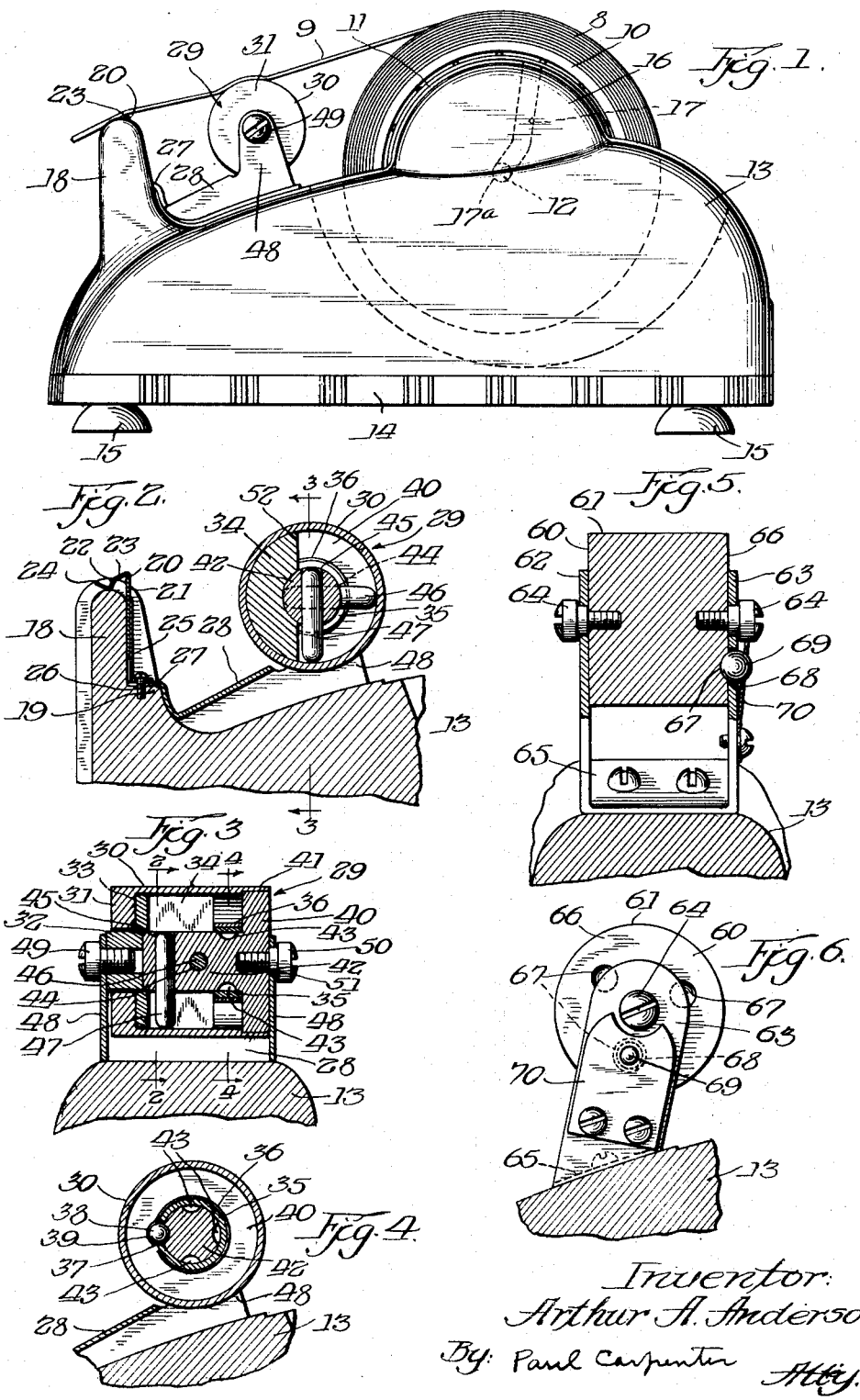
Inventor:
Arthur A. Anderson
By: Paul Carpenter
Atty.

Patented Dec. 22, 1942

2,305,592

UNITED STATES PATENT OFFICE 2,305,592

APPARATUS FOR DISPENSING AND MEASURING ADHESIVE TAPE

Arthur A. Anderson, Rose Township, Ramsey County, Minn., assignor to Minnesota Mining & Manufacturing Company, St. Paul, Minn., a corporation of Delaware Application August 3, 1940, Serial No. 350,256

13 Claims. (Cl. 164—84.5)

This invention relates broadly to apparatus for dispensing adhesive tape from a roll in usable condition and in a predetermined length, and more particularly to a device for dispensing rolls of adhesive tape of a nature such that temporary adhesion between the successive layers of the tape in the roll will normally prevent the tape from unrolling except by the act of the user.

The invention is of considerable utility in dispensing adhesive tape having a thin flexible backing of fabric, paper or non-fibrous material and provided with a normally tacky and pressuresensitive adhesive coating, which does not require moistening with water or other solvents to activate the coating to an adhesive condition, such tapes, for example, as are disclosed in the Richard G. Drew Patents Nos. 1,760,820 and 2,177,627. Tapes of this type are characterized by having a unified adhesive coating possessed of such coherence in relation to its adhesiveness and so firmly united to its backing that the adhesive tape may be stripped from smooth non-fibrous surfaces (not possessing special chemical affinity for the adhesive), to which it may have been temporarily applied, without offsetting of adhesive material to such surfaces. While the present invention relates broadly to dispensing of adhesive tapes of a pressure-sensitive type, the dispenser herein described has been developed with special reference to pressure-sensitive adhesive tapes of the non-offsetting type.

Adhesive tape of the type described is commonly marketed in roll form wound upon a core, and a principal object of the invention resides in the provision of a dispensing device from which portions of the tape may be drawn in a predetermined definite length. A further object of the invention is the provision of an adhesive tape dispenser of the type described which is simple and economical of construction and in which an end portion of the tape roll is conveniently presented in position to be grasped for dispensing purposes so that removal of a desired portion of the tape can be effected without having to pry the strip end from the roll; the provision of an improved tape measuring means which may be detachably mounted in the path of the tape from the roll to a severing element and which may be readily replaced by measuring means adapted to measure a different length of tape; the provision of an improved tape dispensing apparatus in which the tape measuring means operates automatically. In packaging, it is frequently necessary that adhesive tape in definite predetermined lengths be rapidly dispensed and affixed to the wrapping material, and, accordingly, the present invention has considerable utility in that it eliminates the need of the use of a ruler or other measuring indicia.

The invention is shown in the drawing in two preferred embodiments and in each embodiment the core of the tape roll is mounted upon a drum provided with spindles revolubly carried in the dispenser. It is to be understood that other means of supporting the tape roll are contemplated in that the inner sides of the dispenser may be provided with annular flanges and the tape core mounted directly thereon. The forward end of the dispenser is provided with a severing element comprising a severing edge and a surface to which the tape detachably adheres during and after the tape severing operation. Disposed between the severing element and the tape roll is the improved automatic measuring means, which is preferably detachably mounted to a surface of the dispenser proper in order that the measuring means may be readily removed in case it is not desired to dispense tape in definite lengths or in case it is desired to dispense tape in other definite lengths, in which case a similar measuring means adapted to measure the strips of tape in another fixed length may be readily substituted. In one embodiment of the invention the roller of the measuring means, to which the tape adheres as it passes over the measuring means, is provided with positive stop means to interrupt the rotation of the roller and to prevent reversal of the movement of the roller, thereby eliminating possible entanglement of the tape strip through reversal of the movement of the roller.

The invention will be readily understood from the following detailed description in conjunction with the accompanying drawing, in which two preferred embodiments of the invention are shown, and in which:

Figure 1 is a side elevation of the improved dispenser;

Figure 2 is an enlarged fragmentary vertical sectional view of a preferred form of the tape measuring device taken along the line 2 of Figure 3;

Figure 3 is an enlarged fragmentary vertical sectional view taken along the line 3 of Figure 2;

Figure 4 is an enlarged fragmentary vertical sectional view taken along the line 4 of Figure 3;

Figure 5 is an enlarged vertical sectional view of a modified form of the measuring means of the dispenser; and Figure 6 is an enlarged side elevation of the modified measuring means shown in Figure 5.

Referring to the drawing, and more particularly to Figure 1, wherein is shown a roll 8 of adhesive tape, with an extended end strip 9, wound upon a core 10, mounted on a drum 11 provided with central spindles 12. The drum supporting structure comprises a body portion 13, which may be somewhat tank-like in outline, and a preferably weighted base 14 equipped with a plurality of rubber suction cups 15 suitably fastened thereto in any convenient fashion, as by lug screws. The body portion 13 and base member 14 are preferably formed of a single casting of iron or other metal to provide a member having considerable weight. Thus, due to the weight of the base and the suction cups, a structure is provided that is adapted to resist the drag resulting from the pull upon the tape as it is drawn from the dispensing and measuring members of the device, and yet it may be conveniently moved from place to place as desired. If desired, the body portion 13 and base member 14 may be formed by stamping side, front and rear walls and a base portion from sheet metal or other suitable material. The upper part of the body portion 13 is provided with a pair of spaced side members 16 equipped on their inner surfaces with downwardly extending inclined complemental guides 17 adapted to removably receive the spindles 12 of the drum; the lower end portions 17a of the guides serving as bearings for the spindles. The drum 11 is thus removably and rotatably mounted in the side members 16.

The front of the body portion 13 is provided with an upwardly extending column 18 equipped with a shoulder portion 19 to which a severing element 20 may be removably secured, as clearly shown in Fig. 2. The severing element is preferably stamped or die cut from sheet steel and comprises a vertically extending portion 21 and a bent over portion 22 disposed above the column 18. The bent over portion 22 presents a smooth surface 23, to which a portion of the tape strip being dispensed may adhere, and a tape severing edge 24 which may be a cutting knife-like edge or may be formed of a plurality of sharp points or teeth. The severing element 20 is retained in position by means of an angle bar 25 clamping it against the inside portion of the columnar member 18. The clamping plate 25 is secured to the shoulder of the roll supporting structure by means of a screw 26 which likewise secures to the roll supporting structure the slotted end 27 of the support 28 of the tape measuring member.

In order to measure the tape in a fixed length as it is drawn from the roll 8 and before it passes over the severing edge 24, a measuring member 29, preferably in the form of a cylinder, is provided in the path of a strip of tape as it is drawn from the roll 8 toward and above the severing element 20. The adhesive coated surface of the tape faces downwardly as it is drawn from the roll 8, contacts the upper portion of the cylindrical surface 30 of the roller as shown in Fig. 1, temporarily clings thereto by reason of the tacky nature of the adhesive, and as the tape is drawn forwardly by grasping the end portion of the tape strip, the roller, as shown in Fig. 1, is rotated in a counterclockwise direction.

The roller assembly 29 comprises the cylindrical surface 30 and a disc-like web portion 31 at one end thereof serving as a hub mounted on the cylindrical bearing member 32 and supporting the cylindrical surface 30 from the bearing member 32, thus forming an open ended cylindrical portion so that the roller is substantialy hollow. Formed integrally with the bearing member 32 are a disc portion 33 of less diameter than the inner surface of the roller, a semi-cylindrical portion 34 of the same diameter as the disc portion 33, and a cylindrical member 35 of less diameter than the disc portion and adapted to serve as a rotor bearing. A spring clip 36, preferably formed of tempered steel, is removably mounted around the outer surface of the cylindrical bearing member 35 by reason of its resilience. The bearing member 35 is preferably provided with a rounded opening 37 adapted to serve as a nest for a ball 38 disposed therein and releasably retained therein by the curved end 39 of the spring clip 36, as clearly shown in Fig. 4.

The rotor 40, comprising a disc-like web member, is adapted to be frictionally fitted into the end 41 of the roller 30 and to rotate therewith. The rotor 40 is integrally formed with a rotor shaft 42 disposed within the rotor bearing member 35 and is rotatably journaled in a central portion of disc 33. The rotor shaft 42 is provided on the surface of a central portion thereof with one or a plurality of indentations 43 adapted to receive the ball 38. The ball rests may be spaced at desired predetermined equal intervals about the rotor shaft 42; in the embodiment shown in Fig. 4, four equally spaced rests are employed, but it is to be understood that more or fewer rests may be employed, depending on the desired length of tape strips to be measured, and if it is desired to alternately measure different predetermined lengths of tape strip, the spacing between the rests may be altered accordingly.

A central portion of the rotor shaft is provided with one or more cylindrical apertures extending therethrough; in the embodiment of the the drawing as shown in Figs. 2 and 3, two spaced apart bores 44 and 45 are provided extending through the rotor shaft at angles of 90° to each other. The bores 44 and 45 are disposed alternately to face the semi-cylindrical portion 34, as the rotor is rotated, and are adapted to receive loosely drop pins 46 and 47, slightly exceeding in length one-half the diameter of the semi-cylindrical portion 34 for a purpose hereinafter brought out; for example, the semi-cylindrical member 34 may be one and one-quarter inch diameter and the drop pins three-quarter inches long.

The composite measuring member 29 is removably mounted on apertured supports 48 of a bracket having a slotted end 27 in its support 28 secured to the roll supporting structure, as shown in Fig. 1. As shown in Fig. 3, a screw 49 extends through the apertured support 48 and is retained in the roller bearing member 32, which does not rotate with the rotor 40 and the roller surface 30. The shoulder screw 50 likewise extends through the apertured support 48 into the rotor 40 and is adapted to rotate with the rotor 40 and rotor surface 30 since the shoulder portion 51 serves as a bearing on the support 48.

In operation as the end strip 9 of adhesive tape from the roll 8 is drawn forwardly, the adhesive coated under surface of the tape contacts the upper portion of the cylindrical surface 30 of the roller, as shown in Fig. 1, temporarily clings thereto by reason of the tacky nature of the adhesive and rotates the roller in a counterclockwise direction. The rotor 40 and rotor shaft 42 are rotated with the cylindrical surface 30 and, accordingly, the ball 38 is forced out of the indentation in which it may be lodged and when the roller has been rotated one-fourth of its circumference in the embodiment shown, the ball rests in the next detent, thereby interrupting the even movement of the tape from the roll 8 and across the cylindrical surface 30 and indicating to the operator that the desired length of tape has been measured, whereupon this length of tape may be severed by drawing the tape strip in the operator's hands downwardly into contact with the severing element 20 where the serrated edge 24 quickly and cleanly cuts the strip in the desired length.

The pin members 46 and 47, slidably carried in the bores 44 and 45 of the rotor shaft 42, provide a positive stop for the measuring means and are adapted to supplement (or completely replace) the ball 38 and detents 43 described, in that it has been found that operators of the dispensing device sometimes draw the tape strips so rapidly that the detaining effect of the setting of the ball 38 in the rests 43 is overcome and accurate measuring of the tape lengths may not always be obtained solely by that means. As shown in Fig. 2, the semi-cylindrical portion or stator 34 of the roller assembly is fixedly disposed adjacent to the front end of the tape supporting structure, with its face 52 in the vertical position shown, and is so maintained during the operation of the device since this member of the assembly does not rotate with the cylindrical surface 30 and the rotor 40. In operating the device, it will be seen that the pins 46 and 47 rotate with the shaft 42 and at each quarter turn of the roller 30 the then uppermost portion of the pins 46 or 47 comes into engagement with the upper portion of the face 52 of the stator 34, stopping further rotation of the rotor shaft 42 and the roller 30; the time of engagement of the pins 46 or 47 with the face 52 is preferably slightly subsequent to the seating of the ball 38 in one of its rests 43, so that the ball is unseated slightly when the pin is momentarily retained against the face 52 of the stator 34, due to the tension on the tape strip. After the dispensed length of tape is torn off, thereby reducing the tension on the tape strip, the reseating of the ball 38 in one of its detents 43 turns the rotor 40 backwards very slightly so that the pin is no longer held against the stator 34 and it drops downwardly in its bore into the position occupied by pin 47 in Fig. 2. In this position, it is obvious that further counterclockwise movement of the rotor shaft 42 and the roller surface 30 is possible by drawing the tape strip 9 forwardly but reversal of the movement of the roller and motor shaft is prevented by the lowermost portion of the pins 46 or 47 adjacent to the lower portion of the face 52 of the stator 34, thereby preventing return of the tape strip 9 toward the roll 8 which might result in spoilage of portions of the adhesive tape due to the overlapping of the adhesive coated surfaces upon each other.

It will further be understood that if different lengths of tape are to be measured, not only will the number and position of the ball rests have to be varied, as previously described, but likewise the number and position of the pin members will accordingly be changed. Furthermore, it is to be understood that, if desired, the ball 38 and ball rests 43 may be omitted and the sole interrupting means is thus provided by the pin members 46 and 47 and the face 52 of stator 34; in this construction care must be taken to relieve the tension on the undispensed portion of the tape, the end of which, after the severing strip, is secured to the portion 23 of the severing element, in order that the rotor may move backwardly slightly to release the engagement of the pin members against the stator, thereby permitting the pin member to drop to the position of pin 47 in Fig. 2 and permitting counterclockwise rotation of the roller 30.

Further strips of tape of the desired length may readily be obtained by again drawing the tape forwardly across the cylindrical surface 30 until the free rotation of the roller 30 is again interrupted by the resting of the ball 38 in the next rest 43 and the engagement of one of the pins against the wall 52 of stator 34. Rotation of the roller 30 is easily resumed, without releasing any stop members, by merely asserting slightly increased initial pull on the end strip to force the ball 38 upwardly against the resilience of the spring clip 34, whereupon the rotor shaft and the roller surface 30 may be readily rotated. After the desired number of strips of tape have been severed, the free end of the tape remains secured to the surface 23 of the severing element 20 where it can be conveniently grasped when other portions of tape are to be measured and severed.

Thus, a highly satisfactory device in the form of a removably mounted rotor for measuring predetermined lengths of adhesive tape is provided with a positive stop member in which it is impossible for the path of the tape to be reversed.

The embodiment of the invention shown in Figs. 5 and 6 is of much simpler construction than is the embodiment shown in Figs. 2-4, inclusive. The embodiment comprises a cylinder 60, which may be solid or hollow, provided with a smooth surface 61. The cylinder 60 is mounted in a bracket provided with side members 62 and 63 in which the cylinder is rotatably secured by shoulder screws 64. The base member 65 of the bracket may be removably mounted on the body portion 13 of the tape dispenser, as shown in Fig. 1. As shown in Fig. 6, a side wall 66 of the cylindrical member 60 is provided with one or a plurality of equally spaced indentations 67 adapted to receive a ball 69. The rests are preferably spaced at predetermined equal intervals having a common radius; in the embodiment shown in Figs. 5 and 6, three equally spaced rests are employed, but it is to be understood that more or fewer rests may be employed, depending on the desired length of tape strips to be measured, and if it is desired to alternately measure different predetermined lengths of tape, the spacing between the rests may be varied accordingly. The bracket member 63 is provided with a suitable aperture 68 adapted to house the ball 69 which is retained therein by means of a semi-resilient flange member 70 suitably secured to the lower portion of the side member 63. The flange member is apertured to permit a portion of the ball 69 to extend therethrough and form a nest therefor.

The operation of this embodiment of the invention will be readily understood, and, referring to Fig. 1, as the end strip 9 of adhesive tape is drawn forwardly from the roll 8, the tacky under surface of the tape contacts the cylindrical surface 61 of the roller 60, clings there momentarily by reason of the tacky nature of the adhesive and rotates the roller in a counterclockwise direction. During rotation of the roller 60, it will be readily understood that the ball is dislodged from detent 67, rotates along its path on the side 66 of the cylinder and when the roller has been rotated one-third of its circumference the ball rests in the next detent, thereby interrupting the even movement of the tape from the roll 8 and indicating to the operator that the desired length of tape has been measured, whereupon this length of tape may be severed by drawing the tape strip in the operator's hands downwardly across the cutting edge of the severing element 20. Further strips of tape of the desired length may be obtained by again drawing the tape forwardly across the cylindrical surface 61 of the roller 60 until the even rotation of the roller 60 is again interrupted by the resting of the ball bearing 69 in the next detent. Rotation of the roller 60 is easily resumed by merely asserting slightly increased initial pull on the tape strip to force the ball outwardly from the detent. After the desired number of strips of tape have been severed, the free end of the tape remains secured to the surface 23 of the severing element 20 providing a free portion of tape which can be conveniently grasped when other portions of tape are to be dispensed in fixed lengths.

I claim:

1. In a device for dispensing pressure-sensitive adhesive tape, a frame in which a roll of said tape is rotatably mounted, a tape severing element mounted on said frame in advance of said tape roller, a roller member carried on said frame and disposed so that the tape in its normal path to the severing element contacts the upper surface of said roller said tape momentarily adhering to the surface of said roller as it is drawn from its roll and adapted to rotate said roller in one direction as the tape is drawn thereover, and means carried on said roller including a ball rest on a moving part of said roller and a ball yieldingly retained against said moving part and against rotation with said roller and adapted to be seated in said rest to momentarily interrupt the even unidirectional rotation of said roller.

2. In a device for dispensing pressure-sensitive adhesive tape, a frame member rotatably supporting a roll of said tape, a severing element for said tape strip in advance of said roll, a surface adjacent said severing element to which the tape strip may detachably adhere during and after the severing operation and tape measuring means, including a roller interposed between the tape roll and said severing element, said tape strip momentarily adhering to and adapted to rotate the roller as it is drawn from the tape roll, and means carried by said roller adapted to interrupt the even rotation of said roller after predetermined lengths of the tape strip have been drawn thereover, said means including a plurality of pins slidably mounted within the roller and rotating therewith and a member within said roller fixed against rotation to engage said pins at predetermined intervals.

3. In a device for dispensing and measuring pressure-sensitive adhesive tape, a frame rotatably supporting a roll of said tape, bracket members detachably mounted on said frame in advance of said tape roll, a tape measuring member in the form of a roller rotatably mounted in said brackets, one of said brackets being apertured to provide a nest for a ball, a member yieldingly retaining said ball in said nest, and one or more indentations in the adjacent side wall of said roller adapted to receive said ball as said roller is rotated and to interrupt the even unidirectional rotation of said roller.

4. In a device for dispensing and measuring pressure-sensitive adhesive tape, a frame member rotatably supporting a roll of said tape, a tape severing element disposed in advance of said tape roll, roller supporting members detachably mounted on said frame between said tape roll and said severing element, a roller adapted to measure predetermined lengths of said tape rotatably mounted in said supporting members, one of said members being apertured to house a ball, a member secured to said apertured supporting member yieldingly retaining said ball against an adjacent side wall of said roller, and a plurality of indentations in said adjacent side wall of said roller having a common radius and adapted to receive said ball to interrupt the even unidirectional rotation of said roller as the tape strip is drawn thereover.

5. In a device for dispensing pressure-sensitive adhesive tape, a frame in which a roll of said tape is rotatably mounted, a roller mounted on said frame in advance of said tape roll adapted to measure tape strips in predetermined lengths, a shaft within said roller and rotating therewith provided with an indentation, and a ball yieldingly held within said roller in the path of said indentation and secured against rotation with said roller and adapted to be seated in said indentation to momentarily interrupt the free unidirectional rotation of said roller.

6. In a device for dispensing pressure-sensitive adhesive tape, a frame in which a roll of said tape is rotatably mounted, a roller mounted on said frame in advance of said tape roll adapted to measure tape strips in predetermined lengths, a shaft within said roller provided with an indentation on its surface and a ball yieldingly held within said roller in the path of said indentation and adapted to be seated in said indentation to momentarily interrupt the unidirectional rotation of said roller.

7. In a device for dispensing pressure-sensitive adhesive tape, a frame rotatably supporting a roll of said tape, and tape measuring means including a roller disposed in advance of said tape roll and adapted to be rotated by said tape strip as it is drawn over the surface thereof, a shaft within said roller and rotatable therewith, a plurality of aligned indentations in the surface of said shaft, a member within said roller fixed against rotation therewith and serving as a bearing for said shaft, a ball yieldingly secured in a nest in said member in the path of said aligned indentations and adapted to be seated in said indentations during the rotation of said roller to momentarily interrupt the free unidirectional rotation of said roller.

8. In a device for dispensing pressure-sensitive adhesive tape, a frame in which a roll of said tape is rotatably mounted, a roller mounted on said frame in advance of said tape roll adapted to measure tape strips in predetermined lengths, a shaft within said roller provided with an indentation on its surface, a ball yieldingly held within said roller in the path of said indentation and adapted to be seated in said indentation to momentarily interrupt the rotation of said roller, and means within said roller to provide a positive stop for the rotation of said roller and to prevent reversal of the direction of rotation of said roller.

9. In a device for dispensing pressure-sensitive adhesive tape, a frame rotatably supporting a roll of said tape, tape measuring means detachably mounted on said frame in advance of said tape roll, including a roller adapted to be rotated by a strip of said tape drawn thereover, a shaft within said roller and rotating therewith, a plurality of aligned indentations in the surface of said shaft, a member fixedly mounted in said roller against rotation therewith, a ball yieldingly held against said member and against rotation with said roller by a spring member and adapted to be successively seated in said indentations upon rotation of said roller, and one or more pin members slidably extending through said shaft and adapted to engage said fixedly mounted member to interrupt the rotation of said roller.

10. In a device for dispensing pressure-sensitive adhesive tape, a frame rotatably supporting a roll of said tape, tape measuring means detachably mounted on said frame in advance of said tape roll, including a roller adapted to be rotated by a tape strip drawn thereover, a shaft within said roller and rotating therewith, a plurality of aligned indentations in the surface of said shaft, a member fixedly mounted in said roller against rotation therewith, a ball yieldingly held against said member and against rotation with said roller by a spring member and adapted to be successively seated in said indentations upon rotation of said roller, said fixed member having a shoulder portion serving as a bearing for said shaft, one or more pin members slidably extending through said shaft and adapted to abut against said shoulder portion to interrupt the rotation of said roller.

11. In a device for dispensing pressure-sensitive adhesive tape, a frame in which a roll of said tape is rotatably mounted, a roller mounted on said frame in advance of said tape roll adapted to be rotated by a strip of said tape drawn thereover, and means carried by said roller to interrupt the even rotation of said roller after tape strips of predetermined length have been drawn thereover, said means including pin members slidably mounted within said roller and rotating therewith.

12. In a device for dispensing pressure-sensitive adhesive tape, a frame in which a roll of said tape is rotatably mounted, a roller mounted on said frame in advance of said tape roll adapted to be rotated by a strip of said tape drawn thereover, a shaft within said roller and adapted to rotate therewith, a shoulder member within said roller secured agains rotation with said roller, and pin members slidably carried in said shaft adapted to bear against said shoulder members to interrupt the even rotation of said roller after tape strips of predetermined length have been drawn thereover and prevent reversal of the direction of rotation of said roller.

13. In a device for dispensing pressure-sensitive adhesive tape, a casing rotatably supporting a roll of said tape, tape measuring means including a standard mounted on said casing in advance of said tape roll, a roller supported by said standard adapted to be rotated in one direction by said tape strip as it is drawn over the surface thereof, a shaft within said roller and rotatable therewith, a plurality of aligned recesses in the surface of said shaft, a member including a ring portion encircling said aligned recesses and retained against rotation with said roller by said standard, an opening in said ring portion adapted to house a ball in the path of said aligned recesses, a spring clip yieldingly retaining said ball in said opening, said ball being adapted to be seated in said recesses during the rotation of said roller to momentarily interrupt the free unidirectional rotation of said roller.

ARTHUR A. ANDERSON.